United States Patent
Fischer et al.

(10) Patent No.: US 7,180,286 B2
(45) Date of Patent: Feb. 20, 2007

(54) HAND-HELD DEVICE FOR NON-DESTRUCTIVE THICKNESS MEASUREMENT

(75) Inventors: Helmut Fischer, Sindelfingen (DE); Bernhard Scherzinger, Esslingen (DE)

(73) Assignee: Immobiliengesellschaft Helmut Fischer GmbH & Co. KG, Sindelfingen (DE)

( * ) Notice: Subject to any disclaimer, the term of this patent is extended or adjusted under 35 U.S.C. 154(b) by 470 days.

(21) Appl. No.: 10/705,107

(22) Filed: Nov. 10, 2003

(65) Prior Publication Data

US 2004/0165198 A1 Aug. 26, 2004

(30) Foreign Application Priority Data

Nov. 8, 2002 (DE) ................. 102 52 541

(51) Int. Cl.
*G01B 7/06* (2006.01)

(52) U.S. Cl. ...................................... 324/230

(58) Field of Classification Search ........ 324/229–232, 324/227, 242–243, 239, 236, 240
See application file for complete search history.

(56) References Cited

U.S. PATENT DOCUMENTS

| 4,715,007 | A | * | 12/1987 | Fujita et al. ................. 702/172 |
| 5,293,132 | A | * | 3/1994 | Koch ........................... 324/671 |
| 5,467,014 | A | * | 11/1995 | Nix .............................. 324/230 |
| 5,959,451 | A | * | 9/1999 | De Torfino ................. 324/236 |
| 6,340,892 | B1 | * | 1/2002 | Rynhart et al. ............. 324/640 |

* cited by examiner

*Primary Examiner*—Jay M. Patidar

(57) ABSTRACT

An apparatus for non-destructive measurement of the thickness of thin layers, has a housing and a probe which is connected to an evaluation unit and to which signals are emitted during a measurement for determining the layer thickness, and having a display apparatus which indicates at least the measurement data from the evaluation unit. At least one further display apparatus is positioned on the housing away from the plane of the first display apparatus.

11 Claims, 1 Drawing Sheet

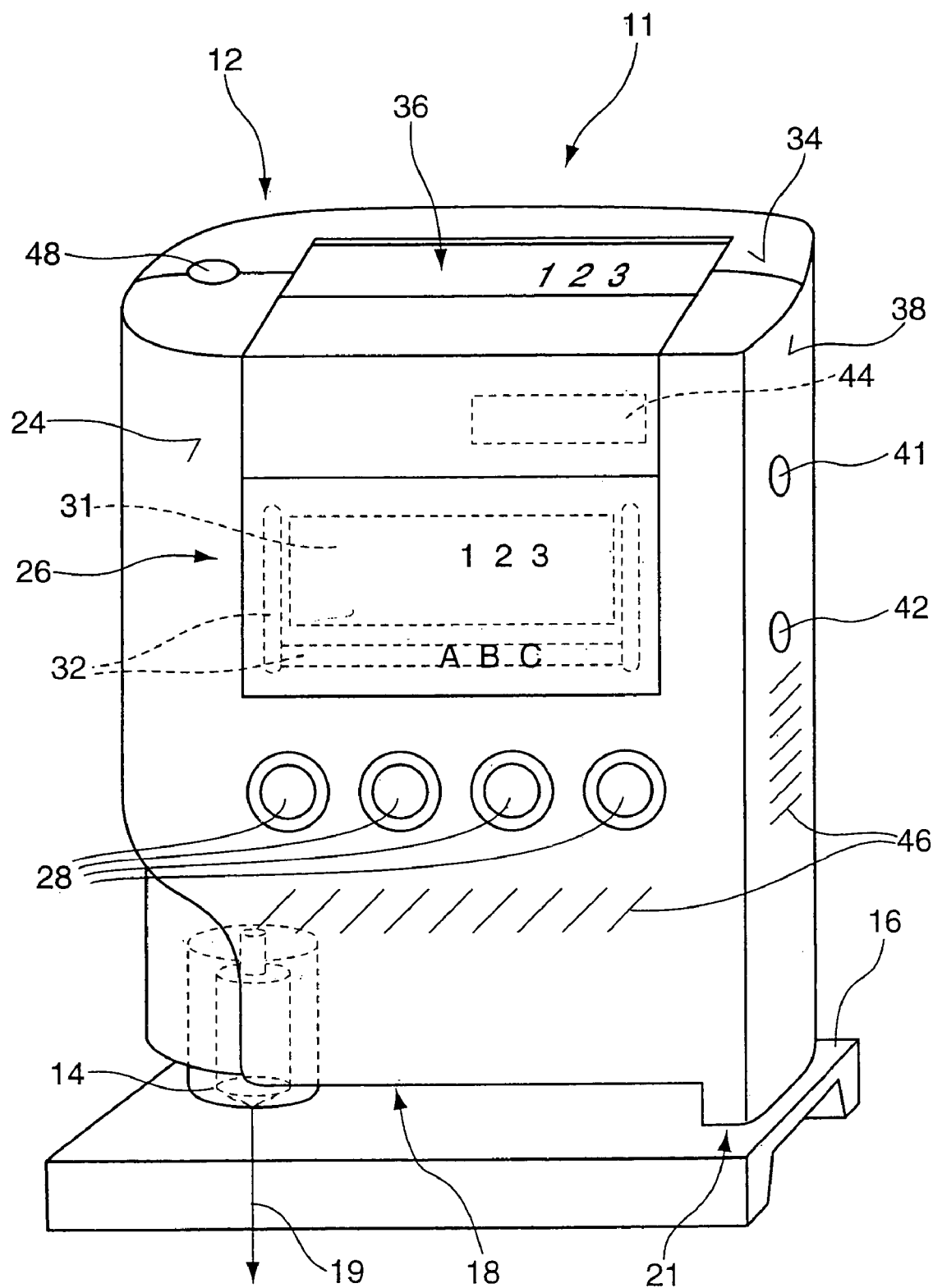

HAND-HELD DEVICE FOR NON-DESTRUCTIVE THICKNESS MEASUREMENT

CROSS-REFERENCES TO RELATED APPLICATIONS

Not applicable.

STATEMENT REGARDING FEDERALLY SPONSORED RESEARCH OR DEVELOPMENT

Not applicable.

SCOPE OF THE INVENTION

1. Field of the Invention

The invention relates to an apparatus for non-destructive measurement of the thickness of thin layers.

2. Relevant Prior Art

Apparatuses for non-destructive measurement of the thickness of thin layers and which can be operated easily by one hand are already known. These hand-held appliances allow stationary use and mobile use both in a workshop and in situ. Apparatuses such as these are applied to the layer to be tested, in order to carry out a measurement. Once the measured value has been detected, it can be read on a display.

An apparatus has been disclosed which has an approximately rectangular housing with a measurement probe for carrying out the layer thickness measurement being provided on one narrow face of the housing and with the measurement probe having a display apparatus opposite it, with the display apparatus being displayed at an angle of 45° between the narrow face opposite the probe and a front face. This apparatus furthermore has a measurement probe which can be removed from the housing and can be positioned separately from the housing on the object to be measured. The determined measured values are transmitted via a cable. The hand-held appliance is located, for example, on a table, alongside the measurement appliance.

This apparatus has the disadvantage that, depending on the lighting conditions, total reflection occurs on the surface, and reading is impossible, while the LCD display is arranged at an angle of 45°. Furthermore, this apparatus has the disadvantage that, during a measurement process in which the probe is arranged separately from the housing, the display is upside down, once again resulting in it being more difficult to read.

Furthermore, a hand-held measurement appliance is known which has an approximately rectangular housing on whose lower narrow face a probe is provided for carrying out the layer thickness measurement. A display apparatus, which can be viewed essentially at right angles to the application direction is provided on a front face of the housing.

Furthermore, an embodiment is known in which the probe is arranged at a specific angle with respect to the housing, so that a display which is provided on a longitudinal face of the housing is intended to be positioned at an angle which is easily visible for the user when carrying out the measurement. However, in order to carry out the measurement, the probe has to be applied at right angles to the measurement surface in order to carry out an exact measurement. The arrangement of the measurement probe at an angle with respect to the housing makes it more difficult to apply the probe correctly. Furthermore, production of such a housing is very complex.

SUMMARY OF THE INVENTION

The invention is therefore based on the object of providing an apparatus for non-destructive measurement of the thickness of thin layers which allows detected information, in particular a measured value, to be read easily by the user, irrespective of the measurement position with respect to the object to be measured.

According to the invention, this object is achieved by the arrangement of at least one further display apparatus, which is positioned on the housing away from a plane of the first display apparatus. By arranging at least one further display away from the plane of the first display apparatus on the housing, this considerably improves the convenience in use. During the measurement, the user can identify the data output, for example, whether a measured value has been determined or a fault has been determined during the measurement, in a simple manner, both in a seated position and in a standing position. Even when taking measurements directly in situ in areas where access is difficult, the arrangement of at least one further display makes it considerably easier to carry out the measurement, and also speeds up the process. Making it easier to read the determined information or data simplifies the measurement, thus considerably shortening the time period for carrying out the measurement, and thus saving costs.

One refinement of the invention provides for the housing to have a first display apparatus as the main display and to have the at least one further display apparatus preferably as a secondary display, with the secondary display apparatus preferably being provided for displaying a reduced amount of data. This makes it possible to keep the physical size of the apparatus small despite the presence of a further display. In addition to a data field for outputting measured values, the main display apparatus advantageously also has further data fields which, for example, display information which is required during the calibration or adjustment of the apparatus. In addition, further parameters that are important for the measurement can be displayed, so that the user is provided with sufficient information while carrying out the measurement. The secondary display is advantageously adjacent to the measured value display or to a fault display. Depending on the physical size, the secondary display may display the same information as the main display.

In one embodiment, the apparatus according to the invention has a first display apparatus, which is provided on the housing parallel to the application direction of the probe onto the object to be measured, and has a second display apparatus which is fitted to the housing at right angles to the application direction. In consequence, the detected data or information is displayed in two of three spatial directions, thus making it easy to read even measurement positions where access is difficult.

One refinement of the invention provides for the first and the further display apparatuses to be provided at right angles to one another on the housing. This arrangement has a simple and cost-effective arrangement of the display apparatuses to form a circuit. Furthermore, it results in simple housing geometries, thus allowing the apparatus to be produced at low cost.

As an alternative, it is possible to provide for the first and the at least one further display apparatuses to be provided at any desired angle with respect to one another, in order to allow the information to be read more easily from different positions which occur during the measurement and handling of the apparatus. For example, the display apparatuses may include an angle of 45°, 60° or 80°. The fitting of the further display apparatus can be made to match the housing shape and geometry. In a corresponding manner, the first and at least one further display arrangements can be aligned on the basis of their association with one another and on the basis of the association and alignment with respect to the measurement probe, or with respect to their application direction.

A further refinement of the invention provides for the first and the at least one further display apparatuses to be connected in parallel to one another. This allows the detected data to be displayed simultaneously on the display apparatuses that are arranged in the housing. This parallel connection can once again be implemented at low cost.

One embodiment of the invention provides for a first display apparatus to be provided on a front face of the housing which has at least two control elements, and for the further display apparatus to be arranged on a narrow face, a rear face or end face of the housing. The display apparatus can, in consequence, be viewed during adjustment, calibration and setting of the apparatus for the measurement, also displaying further data in addition to the data determined by the measurement so that, for example, this allows menu-controlled adjustment of the apparatus. The first and the further display apparatuses are preferably physically separated by a short distance from one another, so that they can be positioned directly on an evaluation unit. The display apparatus is preferably in the form of an LCD display and is provided on a hand-held appliance which is used for non-destructive measurement of the thickness of thin layers. Hand-held appliances such as these can operate not only using the eddy current measurement method but also the magnetic induction measurement method, and both measurement methods may also be integrated in the hand-held appliance. The basic material is in this case identified automatically, and the appropriate measurement method for this purpose is adapted and selected automatically. The measurement method can likewise also be selected manually.

A further embodiment of the invention provides for the secondary display to be in the form of an LED diode. This refinement of the secondary display can result in the user being provided at least with the information as to whether a measurement has been carried out successfully or whether an incorrect measurement has occurred, while reducing the space required to carry out the measurement. A duo-LED diode can advantageously be provided for this purpose which, for example, emits a green signal when measurement has been carried out successfully and emits a red signal in the event of an incorrect measurement. At least two diodes arranged separately from one another can likewise be provided. This arrangement has the advantage that the measurement can also be carried out on objects where access is difficult, and for which the operator requires only the information as to whether a measurement has or has not been carried out. The detected measured value can be read or can be displayed on a display at a later time.

The secondary display, which is in the form of at least one LED diode, can be provided for the first display apparatus, or additionally for the second display apparatus as well. Any desired combination of them is feasible.

Alternatively, it is possible for this at least one LED diode to be provided as a secondary display on a further housing surface for the first display apparatus and, possibly, a further display apparatus, which emits further information than just a light signal.

BRIEF DESCRIPTION OF THE FIGURE OF THE DRAWINGS

The invention as well as further advantageous embodiments and developments of it will be described and explained in more detail in the following text with reference to the example that is illustrated in the drawing. The features which are disclosed in the description and in the drawing may, according to the invention, be used individually in their own right or in any desired combination together. In the figure:

FIG. 1 shows a perspective view of an apparatus according to the invention for the measurement of the thickness of thin layers, in the form of a hand-held appliance.

FIG. 1 shows a perspective view of an apparatus 11 for non-destructive measurement of the thickness of thin layers. This layer thickness measurement appliance can operate using not only the eddy current measurement method but also the magnetic induction measurement method. Both measurement methods can also be integrated in one apparatus 11. The layer thickness measurement range covers a layer thickness up to, for example, 1500 μm. The measurement method is selected as a function of the base to which the layers are applied.

The apparatus 11 has a housing 12 with a probe 14. This probe 14 has an application cap, which is not shown in any more detail, for application to an object to be measured 16. Furthermore, measurement elements are provided in order to carry out the measurement as a function of the method being used, and to pass the determined signals to an evaluation unit which is arranged in the housing 12. In the embodiment illustrated in FIG. 1, the probe 14 is provided on a lower face 18 of the housing 12. The probe 14 is preferably applied at right angles to the measurement surface as indicated by the arrow 19 which shows the application direction in which the apparatus is applied in order to carry out a measurement. In the exemplary embodiment, an application foot 21 is provided on the lower face 18 parallel to the probe 14, in order to make it easier to apply the housing 12 to the object to be measured 16, with the insensitive application foot 21 being applied first of all, after which the measurement probe 14 is positioned on the object to be measured 16.

On a front face 24, the housing 12 has a first display apparatus 26 which has one or more associated control elements 28. The first display apparatus 26 has at least one data field 31, in which the determined data is displayed. Further data fields 32 may also be provided, in order to display the fact that a layer thickness measurement is being carried out on steel or iron. Furthermore, the fact that tolerance limits have been exceeded, a warning message in the event of battery voltage failure or further information can be displayed both in the data field 32 and in the data field 31.

In the exemplary embodiment, by way of example, a narrow face 34 in which a further display apparatus 36 is arranged is provided at right angles to the front face. In the exemplary embodiment, this display apparatus 36 comprises the data field 31. This allows the physical size of a hand-held appliance to be kept small. Alternatively, it is also possible to provide for the display apparatus 36 to have further data fields 32 as well. It is likewise possible to provide for the data fields 31 and 32 to be provided separately on one narrow face, as further display apparatuses 36. The display apparatuses 26, 36 are preferably in the form of LCD displays.

As an alternative to the embodiment illustrated in FIG. 1, the further display apparatus may likewise be provided on a narrow face 38, and/or on the rear face opposite the front face 24.

The housing 12 may, in contrast to the illustrated geometry, have other housing shapes in which, for example, one narrow face or end face is arranged at an angle other than 90° on a front face or main face.

Furthermore, it is possible to provide for the main display to be provided parallel to the application direction, and for the secondary display to be provided at right angles to, or at any given angle to, the application direction of the probe. The housing geometry is appropriately adapted to this application.

It is also possible to provide for the display apparatus to be provided as the main display on a front face of the housing, and for in each case at least one further display apparatus, which may be in the form of a main display or a secondary display, to be provided on at least two immediately adjacent or indirectly adjacent side surfaces.

The housing 12 furthermore has a USB interface 41 and/or an RS232C interface 42. Alternatively, the determined data may also be transmitted by radio by means of a radio module 44 to an external apparatus which has memory, evaluation and further output capabilities. Grips or grooved surfaces 46 for safe handling are provided on the housing 12.

It is also preferable to provide for the first display apparatus 26 and the at least one further display apparatus 36 to have the capability to be switched on and off separately from one another. Depending on the measurement situation, the power requirement for a further display apparatus can be reduced, provided that this display apparatus 31 is not required simply for reading. In contrast to the embodiment illustrated in FIG. 1, in which the first display apparatus 31 is provided at right angles to the application direction 19 of the probe 14, and the further display apparatus 36 is arranged at right angles to it, the at least two display apparatuses 31, 36 which are provided on the housing 12 may be provided at any desired angle with respect to one another, and at any desired angle with respect to the application direction 19 of the probe. Alternatively, the control elements 28 may be provided both on the front face 24 and on one of the narrow faces 34, 38, or only on a front face or one of the two narrow faces 34, 38.

An LED diode 48 is provided as a further display apparatus on the housing 12. This further display apparatus 48 may be provided in addition to the display apparatus 36, or instead of it. The position of the LED diode 48 is illustrated only by way of example, and just one such diode or two or more such diodes can be provided on further housing surfaces or faces. This LED diode 48 is provided, for example, as a duo diode, which emits a red or green signal depending on the control function. For example, green signals are emitted when a measured value is detected during a measurement and has been transferred completely. An incorrect measurement is signalled by means of a red signal. The signals may also be emitted by means of two separate diodes that are arranged in pairs with respect to one another.

It is also possible to provide for a multiple signal to appear on the LED diode 48 when a certain number of measurements have been carried out or measured values have been detected, for example, multiple flashing of the green signal or alternate flashing of the green/red signal, in order to indicate that a specific blocking result from a number of measurements has been detected, and that the series of measurements has thus been terminated. This additional signal can be used to signal to the user whether or not the measurement has been successful, without him needing to look directly at the measured value or at the first display apparatus. This makes it possible not only to improve the flexibility of the measured value indication, but also to increase the demand for different applications and purpose.

We claim:

1. Apparatus for non-destructive measurement of the thickness of thin layers, having a housing and having one probe which is connected to an evaluation unit and to which signals are emitted during a measurement for determining the layer thickness, and having a first display apparatus which indicates at least the measurement data from the evaluation unit, characterized in that at least one further display apparatus is provided, which indicates at least the measurement data from the evaluation unit and is positioned on the housing away from a plane of the first display apparatus.

2. Apparatus according to claim 1, characterized in that the housing has a first display apparatus as the main display and a further display apparatus as a secondary display.

3. Apparatus according to claim 2, characterized in that the secondary display is provided for a data display, which is smaller than the main display.

4. Apparatus according to claim 2, characterized in that the secondary display is in the form of at least one LED diode, which emits at least two different colour signals.

5. Apparatus according to claim 4, characterized in that the LED display emits at least one signal for a measurement which has been carried out successfully or unsuccessfully.

6. Apparatus according to claim 1, characterized in that the first display apparatus is provided parallel to an application direction of the probe onto an object to be measured, and the at least one further display apparatus is provided at right angles to the application direction of the probe to the housing.

7. Apparatus according to claim 1, characterized in that the first and the at least one further display apparatuses are arranged at right angles to one another.

8. Apparatus according to claim 1, characterized in that the first and the at least one further display apparatuses are connected in parallel with one another.

9. Apparatus according to claim 1, characterized in that the first display apparatus is provided on a front face of the housing and has at least two associated control elements and the further display apparatus is provided on a narrow face which is immediately adjacent to the front face.

10. Apparatus according to claim 1, characterized in that at least one display apparatus is in the form of an LCD display.

11. Apparatus according to claim 1, characterized in that the housing is of such a size that it can be used as a hand-held appliance for single handed operation.

* * * * *